United States Patent [19]

Weakley et al.

[11] Patent Number: 4,895,728

[45] Date of Patent: Jan. 23, 1990

[54] METHOD OF LIMITING CONSUMPTION OF ANIMAL FEEDS AND A SELF LIMITING FEED PRODUCT

[75] Inventors: David C. Weakley, St. Louis, Mo.; Kent J. Lanter, Millstadt, Ill.; Danny L. Williams, Manchester, Mo.

[73] Assignee: Purina Mills, Inc., St. Louis, Mo.

[21] Appl. No.: 93,316

[22] Filed: Sep. 4, 1987

[51] Int. Cl.$^4$ .................................................. A23K 1/00
[52] U.S. Cl. .................................... 426/2; 426/74; 426/623; 426/626; 426/630; 426/656; 426/658; 426/646; 426/647; 426/807
[58] Field of Search .................. 426/656, 658, 2, 69, 426/74, 623, 630, 636, 658, 807, 646, 647, 626

[56] References Cited

U.S. PATENT DOCUMENTS

| | | |
|---|---|---|
| 3,019,109 | 1/1962 | Klothen ................................ 99/2 |
| 3,669,676 | 6/1972 | Karr et al. ............................ 99/7 |
| 4,061,728 | 12/1977 | Graham et al. ..................... 424/14 |
| 4,062,988 | 12/1977 | DeSantis ............................ 426/69 |
| 4,117,170 | 9/1978 | Washam ............................. 426/72 |
| 4,171,379 | 10/1979 | Harmon et al. ..................... 426/2 |
| 4,171,385 | 10/1979 | Skoch et al. ....................... 426/658 |
| 4,171,386 | 10/1979 | Skoch et al. ....................... 426/658 |
| 4,182,755 | 1/1980 | McNeff .............................. 424/147 |
| 4,197,319 | 4/1980 | Betz et al. .......................... 426/2 |
| 4,211,796 | 7/1980 | Lanter et al. ....................... 426/2 |
| 4,221,818 | 9/1980 | Schroeder .......................... 426/658 |
| 4,225,621 | 9/1980 | Lanter et al. ....................... 426/2 |
| 4,230,736 | 10/1980 | Betz et al. .......................... 426/601 |
| 4,234,604 | 11/1980 | Betz et al. .......................... 426/2 |
| 4,265,916 | 5/1981 | Skoch et al. ....................... 426/74 |
| 4,285,974 | 9/1981 | Betz et al. .......................... 426/2 |
| 4,311,713 | 1/1982 | Betz et al. .......................... 426/2 |
| 4,431,675 | 2/1984 | Schroeder et al. ................. 426/623 |
| 4,479,978 | 10/1984 | Robertiello et al. ............... 426/626 |
| 4,642,317 | 2/1987 | Palmquist et al. ................. 514/558 |

OTHER PUBLICATIONS

Dialog Accession No. 0784001 File 53: CAB Abstracts (1972-1973), Abstracting Ali et al., Zeitschrift fur Tierphysiologie Tierernahrung und Futtermittelkunde (1977), 39(4), pp. 173-182.

"Feed Manufacturing Technology III", American Feed Industry Association, Inc. (1985), pp. 193-194.

Primary Examiner—R. B. Penland
Attorney, Agent, or Firm—Cohn, Powell & Hind

[57] ABSTRACT

A method of controlling consumption of animal feed is disclosed which is capable of limiting consumption to a desired level per animal without the use of special equipment or additional labor for this purpose. The feed composition includes a basal ration containing an effective amount of sodium hydroxide to control consumption of the feed composition to the desired level.

8 Claims, No Drawings

METHOD OF LIMITING CONSUMPTION OF ANIMAL FEEDS AND A SELF LIMITING FEED PRODUCT

BACKGROUND AND SUMMARY OF THE INVENTION

This invention relates to a process for producing a self limiting animal feed and a product which is self limiting in the amount consumed by animals. Applicants are aware of the following U.S. patents, the disclosures of which are incorporated by reference herein: U.S. Pat. Nos. 3,019,109; 4,061,728; 4,117,170; 4,171,379; 4,171,385; 4,171,386, 4,172,755; 4,197,319; 4,211,796; 4,225,621; 4,230,736; 4,234,604; 4,265,916; 4,285,974; and 4,311,713.

Feed supplements, such as liquid supplements, feed blocks and dry feed forms are widely used for the feeding of domestic animals. Supplements provide essential nutrients, energy, protein, minerals and vitamins to the diet of domestic animals. However, when fed free choice to animals consuming forage, there is a tendency to consume the feed supplements in excessive or non-economical amounts. Thus, it is important with feed supplements fed free choice that there be some mechanism to meter the quantity which the animal consumes. It is preferred that this mechanism be incorporated into or be a characteristic of the feed product itself, rather than requiring the additional expenditure of equipment to meter the feed product or the labor cost involved in controlled feeding of the feed or feed supplement.

The present invention provides a means of limiting intake of animal feed compositions of a wide variety of types Applicants' invention incorporates the self limiting characteristic into the feed product itself to provide control of feed intake. The feed provides the means of controlled feeding of animals without excessive consumption. Special metering equipment or the labor to hand meter the animal feed is not required.

The feed compositions of this invention are animal supplements in which sodium hydroxide has been incorporated as an intake limiter. Applicants have discovered that sodium hydroxide has the unexpected property of effectively limiting feed consumption when very moderate amounts of the sodium hydroxide are added to the animal feed. Sodium hydroxide in proportions of about 1-5% has been found to be effective in controlling consumption of animal feeds, to a desired nutritional and economic level For example, where preferred consumption of a supplement is between about 1-6 pounds per day per animal, depending upon the nutrient density of the supplement, moderate amounts of sodium hydroxide can limit consumption to this level, even if the basal supplement is highly palatable.

It is an object therefore of the present invention to provide a method of self limiting consumption of animal feeds without the requirement of special equipment to control consumption of the animal feed.

It is a further object of the present invention to provide a method of self limiting intake of animal feeds without the requirement for labor or human intervention to manage consumption.

It is also an object of the present invention to provide an animal feed product which may be fed free choice without over consumption by animals.

DESCRIPTION OF THE PREFERRED EMBODIMENTS

In accordance with the present invention, applicants have developed a method for limiting free choice feed consumption by animals and a method of preparing a feed which is self limiting when consumed by the animal. Further, applicants have produced a feed product which is self limiting when consumed by animals. With applicants' product and method, a predetermined amount of nutrient material may be consumed by the animal to provide the desired amount of nutritional material. The amount consumed will vary of course depending upon the type of feed product to which the invention is applied. For example, liquid cattle feed supplements will normally be consumed in amounts of less then about 6 pounds of supplement per animal per day, preferably 4 pounds or less, such as 2–4 pounds. Consumption of solid supplements, such as blocks, meal and pellets, will typically be in about the same range, or generally between about 1 and 6 pounds per animal per day. More complete rations, such as dairy meal and the like, may be consumed in amounts up to about 8 pounds or more per animal per day.

The basal portion of the animal feed may be any standard ration, for example, a standard nutritional supplement such as the liquid feed supplement described in U.S. Pat. No. 4,285,974 Column 4, Example 1, Ration A. A nutritional supplement in block form may be used, such as descried in U.S. Pat. No. 4,171,385, or any standard formulation for animal rations in meal, pellet and cubed form, as is known in the art. To the selected basal supplement is added sodium hydroxide in an amount effective to produce the desired limitation on consumption of the feed product when fed free choice. It will be appreciated that by the use of applicants' discovered method it will not be necessary to include feed limiters of other types, such as non-protein nitrogen sources. As a consequence, it is possible to produce feed products which are free of the non-protein nitrogen components and still provide the desired self limiting effect. Applicants' method can be used in conjunction with other intake limiters if desired. In particular, proportions of sodium hydroxide up to about 6% by weight on a dry basis have been found to be effective at producing a self limiting feed product. Preferable amounts are between about 1–4% by weight on a dry basis. Typically, the sodium hydroxide is added to the feed product as an aqueous solution, for example, aqueous solutions containing between about 25–50% by weight of sodium hydroxide, and the ration is otherwise prepared in a conventional fashion.

The invention may be further understood by reference to the following examples which are set forth as illustrative rather than as limiting the embodiments of the invention.

EXAMPLE 1

A series of complete dairy supplements were produced as shown in Table I. Rations A and B were the basal rations. Ration B contained molasses as an additional palatability factor. The variables are shown in Table I. The rations were prepared by mixing the ingredients. The variables were added dry during mixing. The rations were fed to 24 mid-lactation dairy cows twice daily. Test duration was 16 days. Consumption of feed was as shown in Table II. It should be noted that 2% sodium hydroxide on a dry basis limited consumption to 5.6 pounds per animal per day, the lowest consumption of any ration tested. Feeding of the control rations exhibited consumption of 2½ to 3 times the sodium hydroxide ration. This limitation on consumption was achieved with a very low addition of sodium hydroxide.

TABLE I

| Ration Ingredient | Diet Assignment | | | | | | | |
|---|---|---|---|---|---|---|---|---|
| | A | B 3% Molasses | C A + CaO | D A + CaCl₂ | E A + NaOH | F A + Ca(OH)₂ | G B + CaO | H G + Citric Acid |
| Gr Corn | 14.104 | 14.104 | 14.104 | 14.104 | 14.104 | 14.104 | 14.104 | 14.104 |
| Gr Soybean Hulls | 5.1 | 5.1 | 5.1 | 5.1 | 5.1 | 5.1 | 5.1 | 5.1 |
| Wheat Midds | 65.2 | 62.2 | 66.4 | 64.9 | 65.9 | 65.9 | 63.4 | 63.3 |
| Soybean Meal | 12.2 | 12.2 | 12.2 | 12.2 | 12.2 | 12.2 | 12.2 | 12.2 |
| Plain Salt | 0.5 | 0.5 | 0.5 | 0.5 | 0.5 | 0.5 | 0.5 | 0.5 |
| Vitamin A | 0.021 | 0.021 | 0.021 | 0.021 | 0.021 | 0.021 | 0.021 | 0.021 |
| Selenium .02 | 0.100 | 0.100 | 0.100 | 0.100 | 0.100 | 0.100 | 0.100 | 0.100 |
| Trace Mineral | 0.070 | 0.070 | 0.070 | 0.070 | 0.070 | 0.070 | 0.070 | 0.070 |
| Vitamin D | 0.005 | 0.005 | 0.005 | 0.005 | 0.005 | 0.005 | 0.005 | 0.005 |
| Molasses | 0.0 | 3.0 | 0.0 | 0.0 | 0.0 | 0.0 | 3.0 | 3.0 |
| CaO | | | 1.5 | | | | 1.5 | 1.5 |
| CaCl₂ | | | | 3.0 | | | | |
| NaOH | | | | | 2.0 | | | |
| Ca(OH)₂ | | | | | | 2.0 | | |
| CaCO₃ | 2.7 | 2.7 | | | | | | |
| Citric Acid | | | | | | | | 0.1 |
| TOTAL | 100.0 | 100.0 | 100.0 | 100.0 | 100.0 | 100.0 | 100.0 | 100.0 |

TABLE II

| Variable | Treatments | | | | | | | |
|---|---|---|---|---|---|---|---|---|
| | A | B | C | D | E | F | G | H |
| % Calcium Carbonate | 2.7 | 2.7 | | | | | | |
| % Molasses | 0.0 | 3.0 | 0.0 | 0.0 | 0.0 | 0.0 | 3.0 | 3.0 |
| % Calcium Oxide | | | 1.5 | | | | 1.5 | 1.5 |
| % Calcium Chloride | | | | 3.0 | | | | |
| % Sodium Hydroxide | | | | | 2.0 | | | |
| % Calcium Hydroxide | | | | | | 2.0 | | |
| % Citric Acid | | | | | | | | 0.1 |
| Consumption lbs/head/day | 14.5 | 14.4 | 12.5 | 7.7 | 5.6 | 13.5 | 13.1 | 13.0 |

EXAMPLE 2

A set of nutritional supplement blocks, supplement B, was produced as shown in Table III. Supplement A was a commercial block containing 16.5% protein equivalent from non-protein nitrogen present as urea. (Purina Mills, Inc. Sup-R-Block 2HL ™). The test results are shown in Table IV. The supplement were prepared by mixing the ingredients and then molding by conventional methods. The variable was added as an aqueous solution, the sodium hydroxide added to supplement B was added as a 50% aqueous solution with the proportion of sodium hydroxide being 2.0% in supplement B on a dry basis. The supplement was fed to 20 beef cows free choice, for six weeks. The animals were rotated each week. Average consumption of the sodium hydroxide treated block was considerably below the commercial non-protein nitrogen containing block.

TABLE III

| Ingredient | % by Weight B |
|---|---|
| Gluten Meal | 26.343 |
| Blood Meal | 4.4 |
| Calcium Carbonate | 0.7 |

TABLE III-continued

| Ingredient | % by Weight B |
|---|---|
| Attapulgite Clay | 1.5 |
| Tetrasodium Pyrophosphate | 0.2 |
| Defluorinated Phosphate | 4.5 |
| Plain Salt (NaCl) | 3.0 |
| Animal Fat | 4.7 |
| Water | 18.15 |
| Molasses | 28.3 |
| Vitamins A & D Supplement | 0.007 |
| Magnesium Oxide | 4.0 |
| Sodium Hydroxide (50% solution) | 4.0 |
| Trace Minerals | 0.2 |
| | 100.0 |

TABLE IV

| | TREATMENTS | |
|---|---|---|
| | A Commercial NPN Block | B Test Block With 2% NaOH |
| Consumption lbs/head/day | 5.7 | 3.3 |

EXAMPLE 3

A set of supplemental blocks was produced by the process as described in Example 2. The variables are shown in Table V. Sixty spring calving beef cows were tested in six lots for six weeks. The cows were on pasture plus hay. The blocks were fed free choice. The test results are shown in Table VI. It should be noted that 2% sodium hydroxide (dry basis) in a block not containing non-protein nitrogen produced consumption equal to the block containing 16% protein equivalent from non-protein nitrogen. Four percent sodium hydroxide controlled consumption to about two thirds of that achieved with the non-protein nitrogen containing block.

TABLE V

| Ingredient | % by Weight | |
|---|---|---|
| | B | C |
| Gluten Meal | 16.443 | 15.493 |
| Blood Meal | 11.3 | 12.4 |
| Calcium Carbonate | 0.4 | 0.5 |
| Attapulgite Clay | 1.5 | 1.5 |

TABLE V-continued

| Ingredient | % by Weight | |
| --- | --- | --- |
| | B | C |
| Defluorinated Phosphate | 4.3 | 4.3 |
| Tetrasodium Pyrophosphate | 0.2 | 0.2 |
| Plain Salt | 3.0 | 3.0 |
| Animal Fat | 4.7 | 4.7 |
| Water | 17.45 | 19.1 |
| Molasses | 32.5 | 26.6 |
| Vitamin A-D Supplement | 0.007 | 0.007 |
| Magnesium Oxide | 4.0 | 4.0 |
| Sodium Hydroxide (50% solution) | 4.0 | 8.0 |
| Trace Minerals | 0.2 | 0.2 |
| | 100.0 | 100.0 |

TABLE VI

| | TREATMENTS | | |
| --- | --- | --- | --- |
| | A NPN Containing Block | B 2% NaOH | C Test Block With 4% NaOH |
| Consumption lbs/head/day | 2.95 | 2.98 | 2.05 |

EXAMPLE 4

A series of liquid supplements were produced, by conventional mixing, as shown in Table VII. Supplement A is the basal supplement. The sodium hydroxide was added to the basal as a 50% aqueous solution. The proportion of sodium hydroxide is shown in Table VIII on a dry basis. The supplement was fed to 20 beef cows free choice. The test duration was five weeks. The test animals were fed grass hay free choice.

TABLE VII

| Ingredient | % by Weight | | | |
| --- | --- | --- | --- | --- |
| | A | B | C | D |
| Feather Meal | 12.1 | 12.3 | 12.5 | 12.6 |
| Calcium Carbonate | 2.8 | 2.9 | 2.9 | 3.0 |
| Attapulgite Clay | 1.5 | 1.5 | 1.5 | 1.5 |
| Dicalcium Phosphate | 4.7 | 4.7 | 4.8 | 4.8 |
| Sodium Acid Pyrophosphate | 0.2 | 0.2 | 0.2 | 0.2 |
| Plain Salt | 3.0 | 3.0 | 3.0 | 3.0 |
| Animal Fat | 4.3 | 4.3 | 4.3 | 4.3 |
| Water | 19.5 | 20.35 | 21.2 | 22.0 |
| Molasses | 51.193 | 48.943 | 44.893 | 41.893 |
| Vitamin A-D Supplement | 0.007 | 0.007 | 0.007 | 0.007 |
| Propionic Acid | 0.5 | 0.5 | 0.5 | 0.5 |
| Trace Minerals | 0.2 | 0.2 | 0.2 | 0.2 |
| Sodium Hydroxide (50% solution) | | 4.0 | 0 | 6.0 |
| | 100.0 | 100.0 | 100.0 | 100.0 |

TABLE VIII

| | TREATMENTS | | | |
| --- | --- | --- | --- | --- |
| | A | B | C | D |
| % Sodium Hydroxide | 0.0 | 2.0 | 3.0 | 4.0 |
| Consumption lbs/head/day | 7.1 | 5.5 | 4.3 | 2.4 |

EXAMPLE 5

A series of dry meal supplements were produced, by conventional mixing, as shown in Table IX. Supplement A is the basal supplement. The variables are shown in Table X. The sodium hydroxide was added to the supplement as a 50% aqueous solution. The proportions of sodium hydroxide shown in Table X are on a dry basis. The supplement was fed to 30 beef cows free choice with grass hay available free choice. Test duration was four weeks. The lowest consumption of any variable tested was obtained with 4% NaOH; consumption was limited to less than one half of that experienced with the basal supplement A or with supplement C which supplies an equivalent amount of sodium from NaCl.

TABLE IX

| Ingredient | % by Weight | | | |
| --- | --- | --- | --- | --- |
| | A | B | C | D |
| Ground Corn | 65.1795 | 57.629 | 60.079 | 54.929 |
| Cottonseed Meal | 22.6 | 24.2 | 23.7 | 24.8 |
| Meat Meal | 10.0 | 10.0 | 10.0 | 10.0 |
| Calcium Carbonate | 1.1 | 1.1 | 1.1 | 1.1 |
| Dicalcium Phosphate | 0.95 | 1.0 | 0.95 | 1.0 |
| Plain Salt | | 5.9 | | |
| Vitamin A | 0.0705 | 0.071 | 0.071 | 0.071 |
| Trace Minerals | 0.1 | 0.1 | 0.1 | 0.1 |
| Sodium Hydroxide (50% solution) | | | 4.0 | 8.0 |
| | 100.0 | 100.0 | 100.0 | 100.0 |

TABLE X

| | TREATMENTS | | | |
| --- | --- | --- | --- | --- |
| | A | B | C | D |
| % NaOH | 0.0 | 0.0 | 2.0 | 4.0 |
| % Salt NaCl | 0.0 | 5.9 | 0.0 | 0.0 |
| Consumption lbs/head/day | 8.0 | 7.69 | 7.66 | 3.42 |

EXAMPLE 6

A set of nutritional supplement blocks was produced by the process as described in Example 2 and as shown in Table XI. Supplement B is the basal supplement. The test results are shown as in Table XII. The supplement was prepared by mixing the ingredients and then molding by conventional methods. The variable was added as an aqueous solution, the sodium hydroxide added to supplement A was added as a 50% aqueous solution with the proportion of sodium hydroxide being 2% on a dry basis. The supplement was fed to 20 beef cows free choice, for two weeks. The animals were rotated each week. Average consumption of the sodium hydroxide treated block was considerably below the control (basal) supplement.

TABLE XI

| Ingredient | % by Weight | |
| --- | --- | --- |
| | A | B |
| Gluten Meal | 26.343 | 26.393 |
| Blood Meal | 4.4 | 4.0 |
| Calcium Carbonate | 0.7 | 0.9 |
| Attapulgite Clay | 1.5 | 1.5 |
| Defluorinated Phosphate | 4.5 | 4.5 |
| Tetrasodium Pyrophosphate | 0.2 | 0.2 |
| Plain Salt | 3.0 | 3.0 |
| Animal Fat | 4.7 | 4.7 |
| Water | 18.15 | 16.6 |
| Molasses | 28.3 | 34.0 |
| Vitmain A-D Supplement | 0.007 | 0.007 |
| Magnesium Oxide | 4.0 | 4.0 |
| Trace Minerals | 0.2 | 0.2 |
| Sodium hydroxide (50% solution) | 4.0 | |
| | 100.0 | 100.0 |

TABLE XII

| | TREATMENTS | |
| --- | --- | --- |
| | A<br>Test Block With<br>2% NaOH | B<br>Test Block Without<br>NaOH |
| Consumption<br>lbs/head/day | 7.59 | 11.32 |

It will be appreciated by those skilled in the art that various modifications may be made in the invention within the scope of the invention disclosed. The invention is not to be limited to the examples given herein for purposes of illustration, but only by the scope of the claims appended hereto and their equivalents.

We claim:

1. A method of self feeding ruminant animals comprising administering a feed composition comprising a nutrient containing basal composition with an intake limiting composition, the intake limiting composition consisting essentially of sodium hydroxide, the sodium hydroxide being present in an amount effective to limit intake of the animal feed to a desired consumption level.

2. The method of claim 1 wherein the sodium hydroxide is present at a level of up to about 6% by weight of the feed composition.

3. The method of claim 1 wherein the amount of sodium hydroxide is present at a level of between about 1-4% of the feed composition.

4. The method of claim 1 wherein the sodium amount of hydroxide is effective to limit the intake of the feed to less than about eight pounds per head per day.

5. The method of claim 1 wherein the sodium amount of hydroxide is effective to limit intake of the feed to less than about six pounds per head per day.

6. The method of claim 1 wherein the sodium amount of hydroxide is effective to limit intake of the feed to between about 2-4 pounds per head per day.

7. The method of claim 1 wherein the feed is selected from the group consisting of liquid feeds, dry feeds and feed blocks.

8. The method of claim 1 wherein the animals are cattle.

* * * * *